(12) United States Patent
Carrick et al.

(10) Patent No.: US 8,726,232 B1
(45) Date of Patent: May 13, 2014

(54) IDENTIFICATION OF PATTERNS IN MODELING ENVIRONMENTS

(75) Inventors: James Carrick, Natick, MA (US); Yang Feng, Waltham, MA (US)

(73) Assignee: The MathWorks, Inc., Natick, MA (US)

( * ) Notice: Subject to any disclaimer, the term of this patent is extended or adjusted under 35 U.S.C. 154(b) by 1572 days.

(21) Appl. No.: 11/293,647

(22) Filed: Dec. 2, 2005

(51) Int. Cl.
*G06F 9/44* (2006.01)
*G06G 7/62* (2006.01)

(52) U.S. Cl.
USPC ............................. 717/113; 717/105; 703/13

(58) Field of Classification Search
USPC ................ 703/1–22; 717/104–105; 716/1–21
See application file for complete search history.

(56) References Cited

U.S. PATENT DOCUMENTS

| | | | | |
|---|---|---|---|---|
| 5,257,363 | A * | 10/1993 | Shapiro et al. | 703/13 |
| 5,610,828 | A * | 3/1997 | Kodosky et al. | 716/11 |
| 5,974,254 | A * | 10/1999 | Hsu | 717/109 |
| 6,516,452 | B2 | 2/2003 | Meding | |
| 6,618,837 | B1 * | 9/2003 | Zhang et al. | 716/4 |
| 6,697,965 | B1 | 2/2004 | Shimada | |
| 7,069,204 | B1 * | 6/2006 | Solden et al. | 703/14 |
| 7,178,112 | B1 * | 2/2007 | Ciolfi et al. | 716/1 |
| 7,324,931 | B1 * | 1/2008 | Warlock | 703/13 |
| 7,350,190 | B2 | 3/2008 | Torres et al. | |
| 7,412,367 | B1 * | 8/2008 | Warlock et al. | 703/6 |
| 7,558,710 | B1 | 7/2009 | Aldrich | |
| 7,558,712 | B1 * | 7/2009 | Aldrich | 703/2 |
| 7,567,890 | B1 * | 7/2009 | Warlock | 703/6 |
| 7,647,579 | B2 | 1/2010 | Drissi et al. | |
| 7,650,574 | B2 | 1/2010 | Nattinger | |
| 7,650,594 | B2 | 1/2010 | Nattinger | |
| 7,681,151 | B2 * | 3/2010 | Ciolfi et al. | 716/116 |
| 7,797,673 | B2 | 9/2010 | Szpak | |
| 7,933,755 | B1 * | 4/2011 | Warlock | 703/6 |
| 8,365,139 | B2 | 1/2013 | Szpak | |
| 8,584,088 | B1 * | 11/2013 | Carrick et al. | 717/124 |
| 2003/0217350 | A1 * | 11/2003 | Teig et al. | 716/18 |
| 2004/0078180 | A1 * | 4/2004 | Allen et al. | 703/22 |
| 2004/0090439 | A1 * | 5/2004 | Dillner | 345/440 |
| 2005/0268173 | A1 | 12/2005 | Kudukoli et al. | |
| 2005/0268288 | A1 | 12/2005 | Nattinger | |

(Continued)

OTHER PUBLICATIONS

LabView User Manual [online], National Instruments Corporation, 2003 [retrieved Jan. 28, 2010], Retrieved from Internet : <URL: http://www.ni.com/pdf/manuals/320999e.pdf>, pp. 1-349.*

(Continued)

*Primary Examiner* — Isaac Tecklu
*Assistant Examiner* — Todd Aguilera
(74) *Attorney, Agent, or Firm* — Nelson Mullins Riley & Scarborough LLP

(57) ABSTRACT

A tool for enabling a user, such as a programmer and a designer, to identify patterns in a program or model and to determine duplicated portions of the program or model that have the same or similar pattern is disclosed. The pattern may include the connectivity of the elements in the group as well as the attributes and parameters of the elements in the group. The tool may also enable the user to replace the duplicated portions of the program or model with a sub-program or sub-model that can be shared for the duplicated portions. Code for the sub-model may be used for the simulation or generated code for the duplicated portions of the program or model in the simulation or code generation of the program or model.

33 Claims, 10 Drawing Sheets

(56) References Cited

U.S. PATENT DOCUMENTS

| | | |
|---|---|---|
| 2006/0136863 A1 | 6/2006 | Szpak |
| 2010/0031228 A1 | 2/2010 | Rohe et al. |
| 2010/0058292 A1 | 3/2010 | Nattinger |
| 2010/0058296 A1 | 3/2010 | Nattinger |
| 2013/0145344 A1 | 6/2013 | Szpak |

OTHER PUBLICATIONS

The Mathworks, Simulink Reference Version 5 [online], 2004 [retrieved Mar. 14, 2013], Retrieved from Internet: <http://www.mathworks.com/help/releases/R13sp2/pdf_doc/simulink/slref.pdf>, cover—p. viii, pp. 4-31-4-32.*

Muntz, Martin et al, "Automated Statechart Analysis for User-defined Design Rules," Technische Universität Carolo-Wilhelmina Zu Braunschweig, pp. 1-24 (2003).

The MathWorks, "Simulink, Model-Based and System-Based Design, Using Simulink, Version 5," The MathWorks, Inc. (2004).

Li, Zhenmin et al., "PR-Miner: Automatically Extracting Implicit Programming Rules and Detecting Violations in Large Software Code," Proceedings of the 10th European Software Engineering Conference held jointly with 13th ACM SIGSOFT International Symposium on Foundations of Software Engineering, pp. 306-315 (2005).

MathWorks Automotive Advisory Board, "Controller Style Guidelines for Production Intent Using, MATLAB, Simulink and Stateflow," Version 1.00, 115 pages, (2001).

* cited by examiner

IDENTIFICATION OF PATTERNS IN MODELING ENVIRONMENTS

FIELD OF THE INVENTION

The present invention relates to programming or modeling environments, in particular to methods, systems and mediums for identifying the patterns of a model in the programming or modeling environments.

BACKGROUND OF THE INVENTION

Various classes of block diagram models describe computations that can be performed on application-specific computing hardware, such as a computer, microcontroller, FPGA, and custom hardware. Classes of such block diagram models may include time-based block diagrams such as those found within Simulink® from The MathWorks, Inc. of Natick, Mass., state-based and flow diagrams such as those found within Stateflow® from The MathWorks, Inc. of Natick, Mass., entity flow networks such as those found within Sim-Events from The MathWorks, Inc. of Natick, Mass., and data-flow diagrams. A common characteristic among these various forms of block diagrams is that they define semantics on how to execute the diagram.

Historically, engineers and scientists have utilized time-based block diagram models in numerous scientific areas such as Feedback Control Theory and Signal Processing to study, design, debug, and refine dynamic systems. Dynamic systems, which are characterized by the fact that their behaviors change over time, are representative of many real-world systems. Time-based block diagram modeling has become particularly attractive over the last few years with the advent of software packages such as Simulink® from The MathWorks, Inc. Such packages provide sophisticated software platforms with a rich suite of support tools that makes the analysis and design of dynamic systems efficient, methodical, and cost-effective.

The block diagrams are not exclusively used for representing time-based dynamic systems but also for other models of computation. For instance, flow-charts are block diagrams used to capture process flow and are not generally suitable for describing dynamic system behavior. Data flow block diagrams are block diagrams that describe a graphical programming paradigm where the availability of data (often thought of as tokens) is used to initiate the execution of blocks, where a block represents an operation and a line represents execution dependency describing the direction of data flowing between blocks.

Conventional simulation models become more complex as models are developed that model more complex systems. Hundreds of thousands of blocks that represent primitive and aggregate mathematical operations may be present. To manage the complexity of such models, principles of partitioning, abstraction, and hierarchy are applied. Hierarchy in graphical models is typically captured by subsystems. The subsystems are modeled by primitive blocks and/or additional subsystems. Because subsystems may contain subsystems, a mechanism exists for hierarchically structuring a model.

In a large block diagram model on which a plurality of teams work at the same time, each team may develop modeling constructs independently of other teams and incorporate the constructs into the model. Sometimes, the block diagram model may include duplicated portions of the same or similar pattern incorporated by different teams. The existence of duplicated portions of the same or similar pattern in the block diagram model can reduce the efficiency of the block diagram model. For example, it may reduce simulation performance because the block diagram requires memory space for each of the duplicated portions and hence decreases simulation speed. It may also reduce the embedded system performance because the generated code for the block diagram includes duplicated portions of the same or similar code. Therefore, it is desired to identify duplicated portions of the same or similar pattern in a block diagram model and replace the duplicated portions with a sub-model, or a subsystem, that can be shared for the duplicated portions.

In addition, the project performed by multiple teams may have a design standard or style that should be complied with by each team for project success and teamwork and achieving system integration. For example, Mathworks Automotive Advisory Board (MAAB) guidelines provide guidelines for the patterns of a Simulink® model. In the conventional block diagram environment, it is difficult and time-consuming to check whether a block diagram model complies with the design standard or style. Therefore, it is desired to automatically check whether the patterns of a block diagram model comply with a design standard or style.

SUMMARY OF THE INVENTION

The present invention provides a programming or modeling environment, such as a block diagram environment, in which a text-based or graphical program or model is created and simulated/executed. The present invention may enable a user, such as a programmer and a designer, to identify patterns in the program or model and to determine duplicated portions that have the same or similar pattern. The term "pattern" is used to refer to a group of interconnected elements in the program or model. The pattern may include the connectivity of the elements in the group as well as the attributes and parameters of the elements in the group. The present invention may also enable the user to replace the duplicated portions of the program or model with a sub-program or sub-model that can be shared for the duplicated portions. Code for the sub-program or sub-model may be used for the simulation or generated code for the duplicated portions of the program or model in the simulation or code generation of the program or model.

In accordance with one aspect of the present invention, a method is provided for building a model. The method includes the steps of identifying a pattern in the model. The method also includes the step of determining one or more portions of the model having the pattern. The method further includes the step of replacing at least one of the portions of the model with a sub-model. The sub-model is a model that is able to be shared by a plurality of models.

In another aspect of the invention, a system is provided for building a model. The system includes a pattern identifier for identifying a pattern in the model. The system also includes a software tool for determining one or more portions of the model having the pattern, and replacing at least one of the portions of the model with a sub-model. The sub-model is a model that is able to be shared by a plurality of models.

In another aspect of the invention, a medium is provided for holding instructions executed in a computer for a method of building a model. The instructions are executed to identify a pattern in the model. The instructions are also executed to determine one or more portions of the model having the pattern. The instructions are further executed to replace at least one of the portions of the model with a sub-model. The sub-model is a model that is able to be shared by a plurality of models.

By replacing the duplicated portions of the program or model with a shared model, the present invention can improve simulation performance, reduce the required memory size and enhance the simulation speed. The present invention also improves the embedded system performance of generated code, and the validation and verification performance of the program or model.

The present invention may identify the patterns of the model to determine whether the patterns of the model comply with a modeling standard or style. A user may define an undesired pattern that does not comply with the modeling standard or style. The patterns of the model are identified to determine portions of the undesired pattern in the model. If the portions of the undesired pattern are determined in the model, they can be replaced with a desired pattern that complies with the modeling standard or style.

In one aspect of the invention, a method is provided for building a model. The method includes the step of providing a modeling standard or style. The method also includes the step of identifying patterns in the model. The method further includes the step of determining whether the patterns in the model comply with the model standard or style.

In another aspect of the invention, a medium is provided for holding instructions executed in a computer for a method of building a model. The instructions are executed to provide a modeling standard or style. The instructions are also executed to identify patterns in the model. The instructions are further executed to determine whether the patterns in the model comply with the model standard or style.

BRIEF DESCRIPTION OF THE DRAWINGS

The aforementioned features and advantages, and other features and aspects of the present invention, will become better understood with regard to the following description and accompanying drawings, wherein.

DETAILED DESCRIPTION

Figure 1:
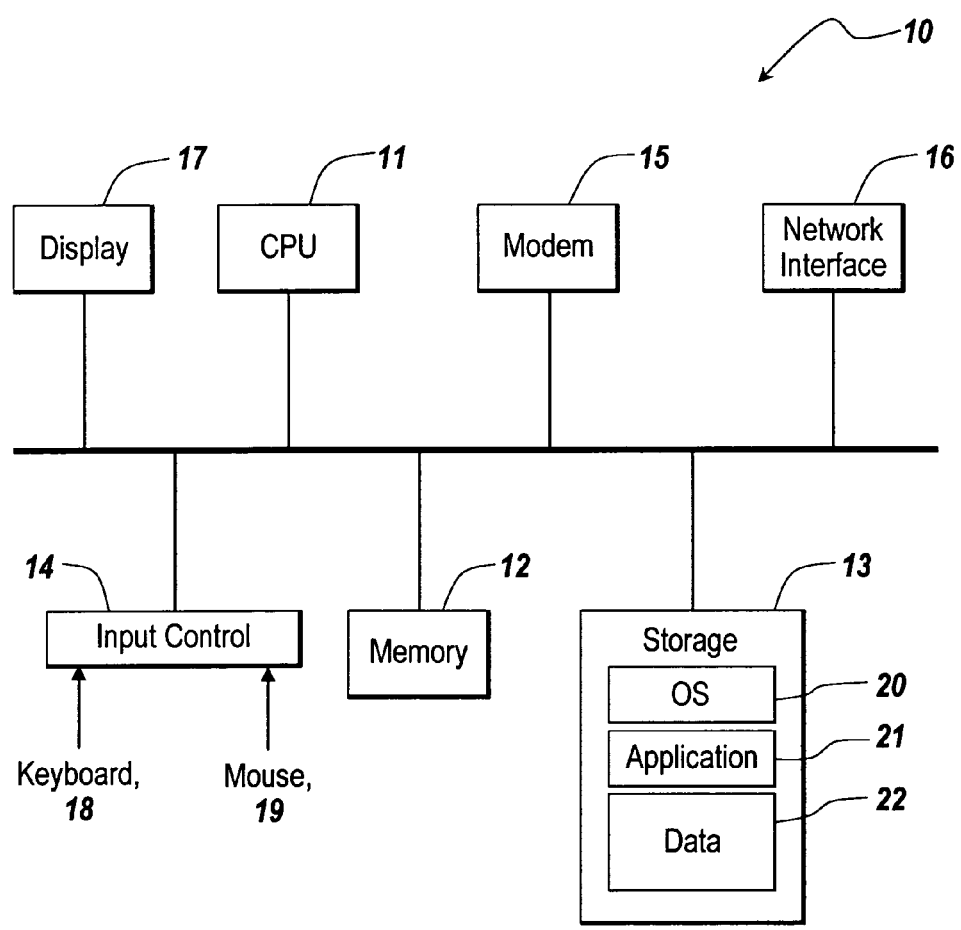
FIG. 1 shows an exemplary computing device suitable for practicing the illustrative embodiment of the present invention.

Certain embodiments of the present invention are described below. It is, however, expressly noted that the present invention is not limited to these embodiments, but rather the intent is that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

The illustrative embodiment of the present invention provides a tool for identifying patterns in a program or model. The terms "program/programming" and "model/modeling" will be used interchangeably in the description of the illustrative embodiment. In the description of the illustrative embodiment, the simulation of the graphical program/model is also referred to as the execution of the program/model.

The illustrative embodiment will be described below solely for illustrative purposes relative to a time-based block diagram model. Although the illustrative embodiment will be described relative to the time-based block diagram model, one of skill in the art will appreciate that the present invention may apply to other programs or models, including state-based and flow diagrams, data flow diagrams, event-based circuits, physics models, and Unified Modeling Language (UML) models.

The illustrative embodiment will be described below relative to a Simulink® model, a time-based block diagram found in Simulink® from The MathWorks, Inc. of Natick, Mass. Nevertheless, those of skill in the art will appreciate that the present invention may be practiced relative to models implemented in other modeling environments, including but not limited to LabVIEW® from National Instruments Corporation of Austin, Tex., and Rational Rose® from IBM of White Plains, N.Y.

The illustrative embodiment of the present invention provides a tool that enables a user, such as a programmer and a designer, to identify patterns in a block diagram model and to determine duplicated portions having the same or similar pattern. The term "pattern" is used to refer to a group of interconnected blocks in the block diagram model. The pattern may include the connectivity of the blocks in the group. The pattern may also include the attributes and parameters of the blocks in the group as well as the connections between the blocks. The illustrative embodiment may enable the user to replace the duplicated portions with a sub-model, such as a Subsystem block and a Model block provided in Simulink®, that can be shared for the duplicated portions within the block diagram model or by a plurality of block diagram models. Code for the sub-model may be used for the simulation or generated code for the duplicated portions of the block diagram model in the simulation or code generation of the block diagram model.

The illustrative embodiment may identify the patterns of the block diagram model to determine whether the patterns of the block diagram model comply with a modeling standard or style. A user may define an undesired pattern that does not comply with a modeling standard or style. The patterns of the block diagram model are identified to determine whether the undesired pattern exists in the block diagram model. If an undesired pattern is found in the block diagram model, it can be replaced with a desired pattern that complies with the modeling standard or style.

FIG. 1 is an exemplary computing device 10 suitable for practicing the illustrative embodiment of the present invention. One of ordinary skill in the art will appreciate that the computing device 10 is intended to be illustrative and not limiting of the present invention. The computing device 10 may take many forms, including but not limited to a workstation, server, network computer, quantum computer, optical computer, bio computer, Internet appliance, mobile device, a pager, a tablet computer, and the like.

The computing device 10 may be electronic and include a Central Processing Unit (CPU) 11, memory 12, storage 13, an input control 14, a modem 15, a network interface 16, a display 17, etc. The CPU 11 controls each component of the computing device 10 to provide the block diagram environment 30. The memory 12 temporarily stores instructions and data and provides them to the CPU 11 so that the CPU 11 operates the computing device 10 and runs the block diagram environment 30. The storage 13 usually contains software tools for applications. The storage 13 includes, in particular, code 20 for the operating system (OS) of the device 10, code 21 for applications running on the operation system including applications for providing the block diagram environment 30, and data 22 for block diagrams created in the block diagram environment 30. Those of ordinary skill in the art will appreciate that the application can be stored in the memory 12 as well, much like the data, and even the OS, or they can be stored on the network described below with reference to FIG. 2.

Optionally, the computing device 10 may include multiple CPUs for executing software loaded in the memory 12, and other programs for controlling system hardware. Each of the CPUs can be a single or multiple core processor. The code loaded in the memory 12 may run in a virtualized environment, such as in a Virtual Machine (VM). Multiple VM's may be resident on a single processor. The computing device 10 may include specialized hardware, such as a FPGA and an ASIC, and all or a portion of the code may run on the FPGA or ASIC. Implementation in hardware is faster, for example, because it does not require the operating system overhead. In addition, this frees up the CPU 11 to do other things and hence accelerates the performance of the computing device 10.

The input control 14 may interface with a keyboard 18, a mouse 19, and other input devices. The computing device 10 may receive through the input control 14 input data necessary for creating block diagrams, such as the selection of the attributes and operations of component blocks in the block diagrams. The computing device 10 may also receive through the input control 14 input data necessary for controlling the execution of the block diagrams. The computing device 10 may display in the display 17 user interfaces for the users to create or edit the block diagrams.

Figure 2:
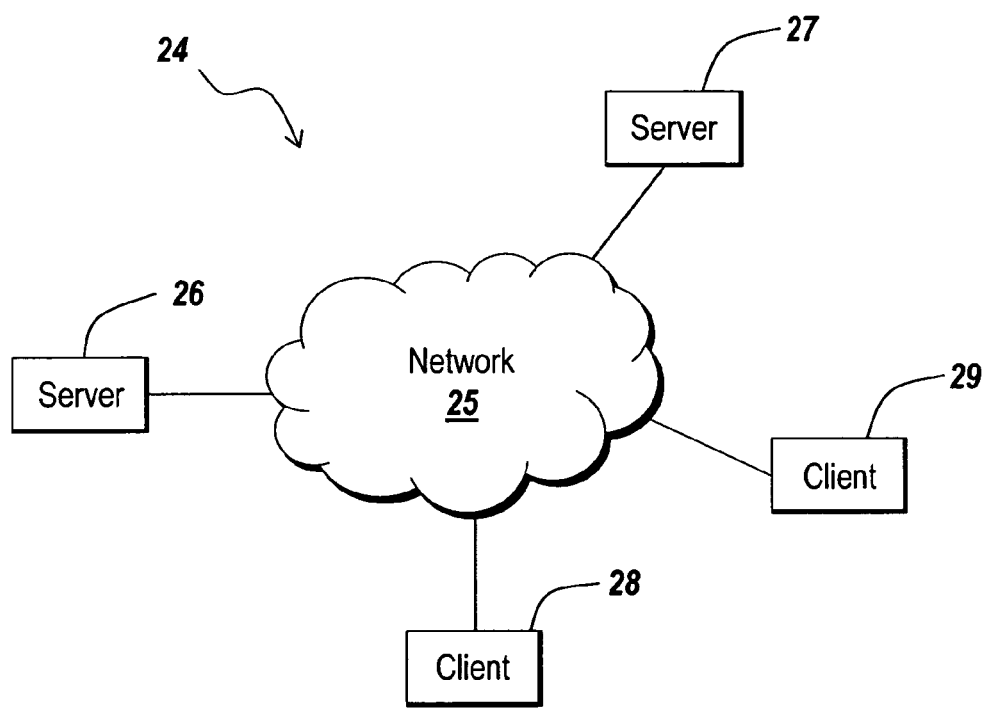
FIG. 2 shows an exemplary network environment suitable for the distributed implementation of the illustrative embodiment of the present invention.

FIG. 2 is an exemplary network environment 24 suitable for the distributed implementation of the illustrative embodiment. The network environment 24 may include one or more servers 26 and 27 coupled to clients 28 and 29 via a communication network 25. The network interface 16 and the modem 15 of the computing device 10 enable the servers 26 and 27 to communicate with the clients 28 and 29 through the communication network 25. The communication network 25 may include Internet, intranet, LAN (Local Area Network), WAN (Wide Area Network), MAN (Metropolitan Area Network), etc. The communication facilities can support the distributed implementations of the present invention.

In the network environment 24, the servers 26 and 27 may provide the clients 28 and 29 with software components or products under a particular condition, such as a license agreement. The software components or products may include those for providing a block diagram environment and a block diagram created in the block diagram environment. For example, the client 28 may build a block diagram using a software component provided by the server 26 and send the server 26 the block diagram for the execution of the block diagram. The server 26 then returns execution results to the client 28.

Figure 3:
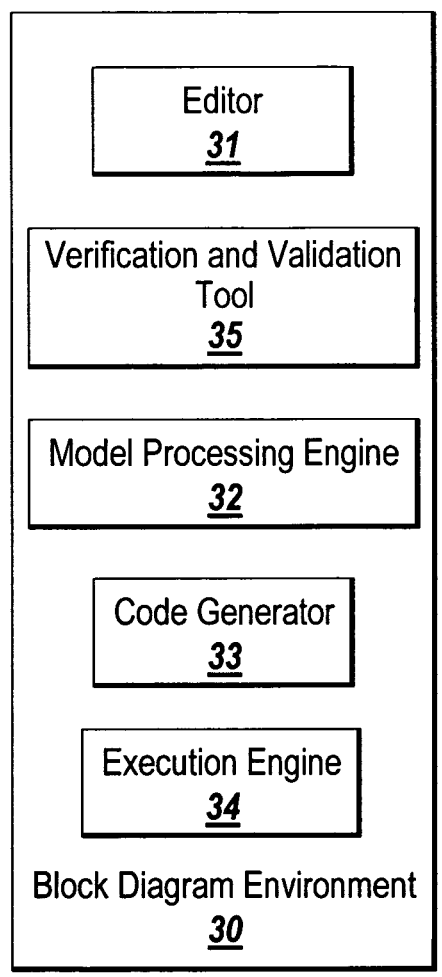
FIG. 3 depicts an exemplary block diagram environment provided in the illustrative embodiment of the present invention.

FIG. 3 depicts an exemplary block diagram environment 30 provided in the illustrative embodiment. The block diagram environment 30 may include an editor 31, a verification and validation tool 35, a model processing engine 32, a code generator 33, and a model execution engine 34. An exemplary block diagram environment 30 can be provided by the software products, such as Simulink® from The Mathworks, Inc. of Natick, Mass., that cater to various aspects of dynamic system analysis and design. Such products allow users to perform various types of tasks including constructing system models through a user-interface that allows drafting block diagram models, allowing augmentation of a pre-defined set of blocks with custom user-specified blocks, the use of the block diagram model to compute and trace the temporal evolution of the dynamic system's outputs ("executing" the block diagram), and automatically producing either deployable software systems or descriptions of hardware systems that mimic the behavior of either the entire model or portions of it (referred to herein as "code generation"). Although the discussion contained herein focuses on Simulink® from the MathWorks, Inc. of, Natick Mass., those skilled in the art will recognize that it is applicable to other block modeling software applications.

The block diagram editor 31 allows users to perform such actions as draw, edit, annotate, save, and print out block diagram representations of dynamic systems. As noted earlier, blocks are the fundamental mathematical elements of a classic block diagram model. Simulink® extends the classic block diagram models by introducing the notion of two classes of blocks, non-virtual blocks and virtual blocks. Non-virtual blocks are functional units. A virtual block is provided for graphical organizational convenience and plays no role in the definition of the system of equations described by the block diagram model. Examples of virtual blocks are the Bus Creator virtual block and Bus Selector virtual block which are used to reduce block diagram clutter by managing groups of signals as a "bundle". Virtual blocks may be used to improve the readability of models. Simulink® further extends the meaning of a non-virtual block to include other semantics, such as a "merge" block semantic. The merge block semantic is such that on a given time step its output is equal to the last block to write to an input of the merge block. An additional extension provided by Simulink® is the concept of conditional execution. Simulink® contains the concept of conditional and iterative subsystems that control when in time block methods execute for a sub-section of the overall block diagram.

The verification and validation tool 35 contributes to the work of certifying the correct design, implementation, and testing of the block diagram. The verification and validation tool 35 helps the user establish requirements for the block diagram to determine whether the block diagram satisfies the requirements. The verification and validation tool 35 may verify proper function of the block diagram by monitoring model signals during extensive testing. The verification and validation tool 35 may also validate the block diagram, making sure that all possible model decisions are taken through testing based on all possible model conditions.

In particular, the verification and validation tool 35 enables the user to identify patterns in a block diagram model and to determine duplicated portions of the block diagram model that have the same or similar pattern. The verification and validation tool 35 may also enable the user to replace the duplicated portions with a sub-model, such as a Subsystem block and a Model block provided in Simulink®, that can be shared for the duplicated portions within the block diagram model or by a plurality of models. Code for the sub-model may be used for the simulation or generated code for the duplicated portions of the block diagram model in the simulation or code generation of the block diagram model.

The verification and validation tool 35 may identify the patterns of the block diagram model to determine whether the patterns of the block diagram model comply with a modeling standard or style. The verification and validation tool 35 may enable the user to define an undesired pattern that does not comply with a modeling standard or style. The verification and validation tool 35 identifies the patterns of the block diagram model to determine whether the undesired pattern exists in the block diagram model. If an undesired pattern is found in the block diagram model, it can be replaced with a desired pattern that complies with the modeling standard or style.

The processing engine 32 carries out the task of compiling the block diagram to produce an "in-memory executable" version of the model that is used for generating code and/or simulating and/or trimming or linearizing a block diagram model. The compile stage involves checking the integrity and validity of the block interconnections in the block diagram. In this stage, the engine 32 also sorts the blocks in the block diagram into hierarchical lists that are used when creating the block method execution lists. In the link stage, the processing engine 32 uses the result of the compiled stage to allocate memory needed for the execution of the various components of the block diagram. The linking stage also produces block method execution lists that are used by the simulation, trimming, or linearization of the block diagram. Included within the link stage is the initialization of the model which consists of evaluating "setup" methods (e.g. Block Start, Block Initialize, Enable, and ConstantOutput methods). The block method execution lists are generated because the simulation, trimming, and/or linearization of a model must execute block methods by type (not by block) when they have a sample hit.

For linearization, Simulink® uses the block method execution lists in a prescribed fashion to produce a linear state space representation of the dynamic system described by the block diagram.

A block diagram model can be trimmed to find a trim point of a dynamic system. A trim point, also known as an equilibrium point, is a point in the parameter space of a dynamic system at which the system is in a steady state. For example, a trim point of an aircraft is a setting of its controls that causes the aircraft to fly straight and level. Mathematically, a trim point is a point where the system's state derivatives equal zero. Trimming starts from an initial point and searches, using a sequential quadratic programming algorithm, until it finds the nearest trim point. A user can supply the initial point implicitly or explicitly. Trimming can find trim points that meet specific input, output, or state conditions, and it can find points where a system is changing in a specified manner, that is, points where the system's state derivatives equal specific nonzero values.

After linking has been performed, the code generator 33 may generate code. In this stage, the code generator 33 may choose to translate the block diagram model (or portions of it) into either software modules or hardware descriptions (broadly termed code). If this stage is performed, then the stages that follow use the generated code during the execution of the block diagram. If this stage is skipped completely, then the execution engine 34 uses an interpretive mode of execution for the block diagram. In some cases, the user may not proceed further with the execution of the block diagram because they would like to deploy the code outside the confines of the block diagram software. Upon reaching the simulation stage, the execution engine 34 uses a simulation loop to execute block methods in a pre-defined ordering upon a sample hit to produce the system responses as they change with time.

Figure 4:
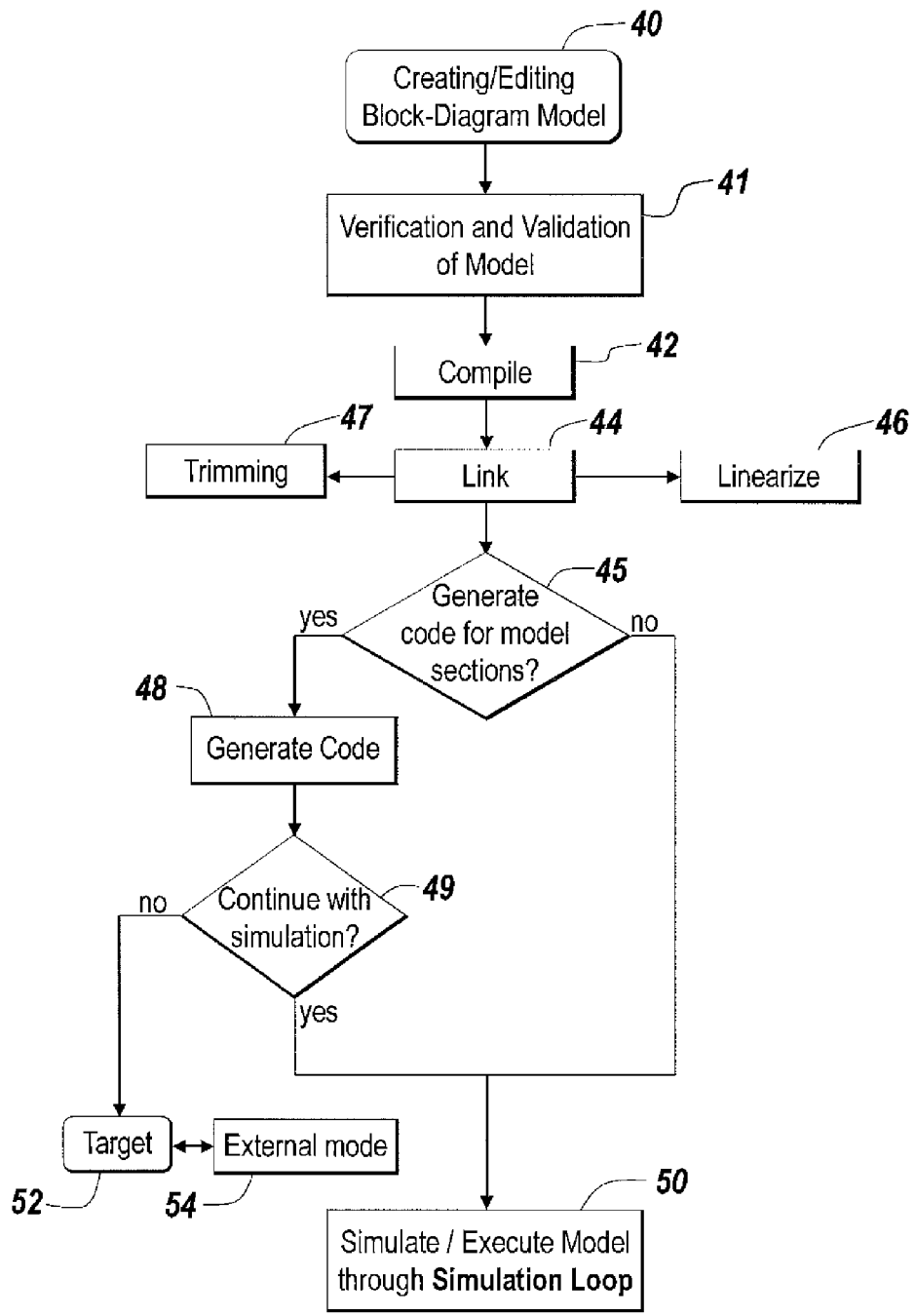
FIG. 4 is a flow chart of the sequence of steps used to perform simulation of the block diagram.

The interrelationship between the various stages is illustrated in a flowchart in FIG. 4. When the block diagram is created/edited (step 40), the block diagram is verified/validated (step 41) and compiled (step 42). Following the compilation stage, is the model link stage (step 44) which may also produce linear models (step 46), or trim the block diagram model to find a trim point of a dynamic system of the block diagram model (step 47). Code may or may not be generated (step 45). If code is generated (step 48), a decision is made (step 49) whether to continue the simulation. If the decision is made to continue the simulation the model is simulated/executed through the Simulation Loop (step 50). If the simulation is not continued, the code may be delivered to a target (step 52) and executed in an external mode (step 54). If code is not generated the block diagram may execute in interpretive mode when entering the Simulation Loop (step 50).

In the illustrative embodiment, the verification and validation of the model may be performed on the graphical representations and input text of the block diagram model before the model is compiled and/or linked. In other embodiments of the present invention, the verification and validation of the mode can be performed after the block diagram model is compiled and/or linked. In those embodiments, the verification and validation of the model may be performed on the intermediate representations of the model from which virtual blocks and other elements that do not contribute to the construction of the patterns of the model are removed. The verification and validation of the block diagram will be described below in more detail with reference to FIGS. 5-12.

Figure 5:
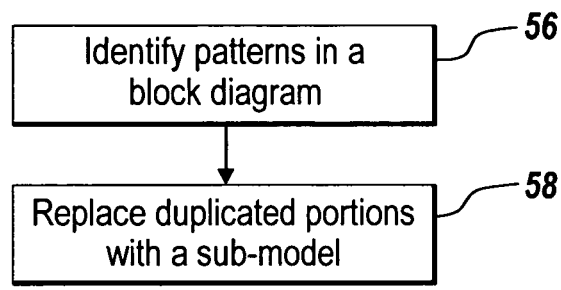
FIG. 5 is a flowchart showing an exemplary operation of the verification and validation tool depicted in FIG. 3.

FIG. 5 is a flowchart showing an exemplary operation for the verification and validation tool to identify the patterns of the block diagram in the illustrative embodiment. The verification and validation tool 32 determines the attributes and parameters of blocks and the connections between the blocks in the block diagram to identify the patterns of the block diagram (step 56). A block diagram is generally represented schematically as a collection of blocks interconnected by lines that represent signals. A signal represents the input and output of a dynamic system. Each block represents an elemental dynamic system. A line emanating at one block and terminating at another signifies that the output of the first block is an input to the second block. Signals correspond to the time-varying quantities represented by each line connection. The source block of a signal writes to the signal at a given time instant when its system equations are solved. The destination blocks of this signal read from the signal when their system equations are being solved. The block diagram includes a plurality of blocks, lines and ports that are interconnected. The pattern of the block diagram can be determined by the connectivity of a group of blocks in the block diagram. The attributes and parameters of the blocks as well as the connections between the blocks can be used to determine the pattern of the block diagram.

Figure 6:
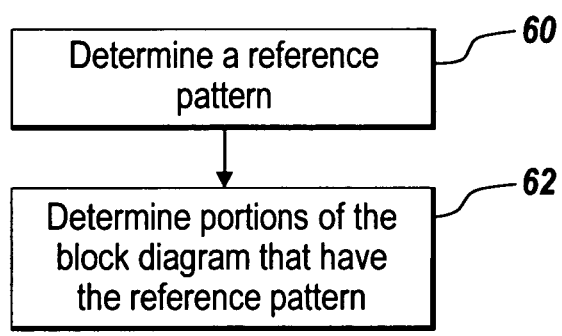
FIG. 6 is a flowchart showing an exemplary operation for identifying the patterns in a block diagram.

FIG. 6 is a flowchart showing an exemplary operation for identifying the patterns of a block diagram. The verification and validation tool 32 determines a reference pattern to be searched in the block diagram (step 60). When the block diagram includes a sub-model, the pattern of the sub-model can be a reference pattern. FIG. 7 shows an exemplary block diagram 68 that includes a sub-model. The block diagram includes a sub-model block 70, a gain block 76 and a delay block 78. The sub-model block 70 represents or refers to a sub-model 72 including the gain block 73 and the delay block 74. The sub-model block 70 can be a Subsystem block or a Model block provided in Simulink®. One of ordinary skill in the art will appreciate that the Subsystem block and the Model block are illustrative and the sub-model block can be any type of blocks that can represent or refer to a sub-model depending on the block diagram environment.

The Subsystem block represents the subsystem of a system that contains it. The Subsystem block can represent a virtual subsystem or a true (atomic) subsystem, depending on the value of its parameter. An Atomic Subsystem block is a Subsystem block that has its parameter selected by default. The subsystem can be implemented or created by copying the Subsystem (or Atomic Subsystem) block from the library into the block diagram model, and then add blocks to the subsystem by opening a window for the Subsystem block and copying blocks into the window. Alternatively, the subsystem can be created by selecting the blocks and lines that are to make up the subsystem using a bounding box, and then choosing "Create Subsystem" option from the Edit menu. The selected blocks are replaced with a Subsystem block. When a user opens the Subsystem block, the window displays the blocks the user selected, adding Inport and Outport blocks to reflect signals entering and leaving the subsystem. The Subsystem block can be made as a reusable function (optionally in a separate file) that can be called for each identical subsystem block in the model. The reusable function option yields code that is called from multiple sites (hence reused).

The Model block allows a user to include a model as a block in another model. The Model block displays input ports and output ports corresponding to the model's top-level inport and outport blocks. This allows the user to connect the included model to other blocks in the containing model. During simulation, Simulink® invokes an S-function called the simulation target to compute the model's outputs. If the simulation target does not exist at the beginning of a simulation or when the user updates the model's block diagram, Simulink® generates the target from the referenced model. If the target exists, Simulink® checks whether the included model has changed since the last time the target was built. If so, Simulink® regenerates the target to reflect changes in the model. Simulink® uses the same simulation target for all instances of an included model whether in the same model or different model. A referenced model can itself reference other models. The topmost model in a hierarchy of model references is called the root model. A parent model can contain multiple references to the same model as long as the referenced model does not define global data.

Figure 7A:
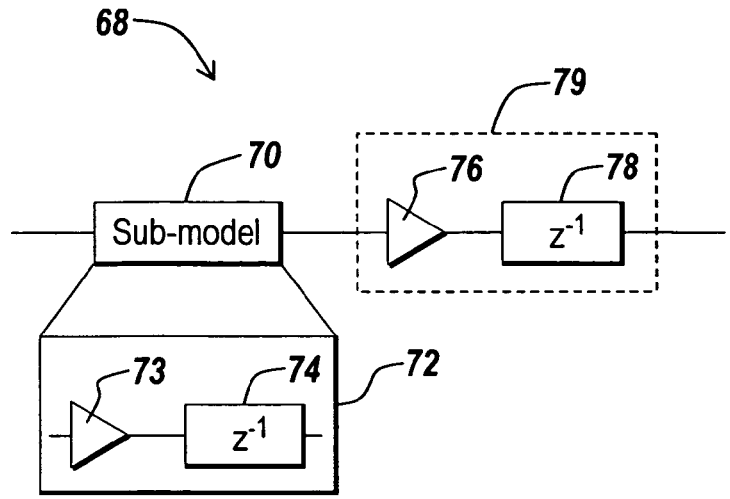
FIG. 7A depicts an example of the block diagram that includes a sub-model block in the illustrative embodiment.
Figure 7B:
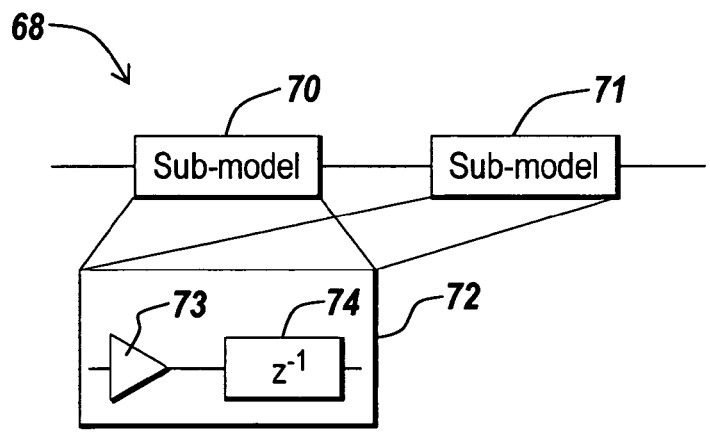
FIG. 7B shows that a portion of the block diagram is replaced with the sub-model depicted in FIG. 7A.

Referring back to FIG. 6, after the reference pattern is determined, the verification and validation tool 32 searches the block diagram for the reference pattern (step 62). As depicted in FIG. 7A, for example, the verification and validation tool 32 identifies the pattern of the portion 79 including the gain block 76 and the delay block 78, and determines that the pattern of the portion 79 is the same as the reference pattern. The verification and validation tool 32 then replaces the portion 79 including the gain block 76 and the delay block 78 with the sub-model block 71, as depicted in FIG. 7B (step 58 in FIG. 5). The sub-model block 71 represents or refers to the sub-model 72 including the gain block 73 and the delay block 74, which has the same pattern as the portion 79 including the gain block 76 and the delay block 78. In the simulation of the block diagram 68, code for the sub-model 72 is loaded in memory once and used for the simulation of the sub-model block 70 as well as the sub-model block 71. In the code generation of the block diagram, code for the sub-model 72 is included in the generated code once and can be used for the sub-model block 70 as well as the sub-model block 71

Figure 8A:
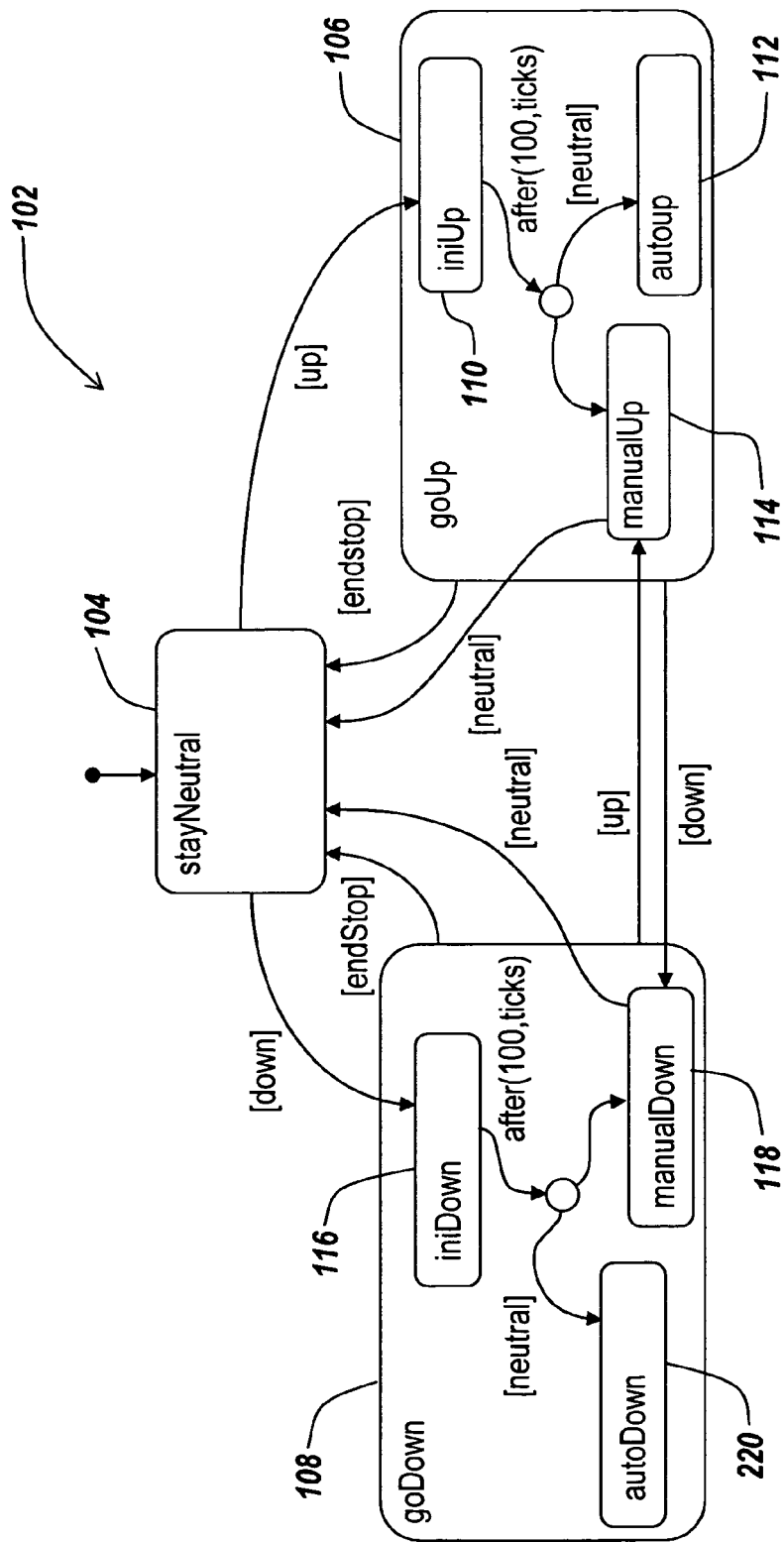
FIG. 8A depicts an exemplary state-based and flow diagram that includes the same event structures in the illustrative embodiment.

The same concept can apply to other block diagrams, such as state-based and flow diagrams. An exemplary state-based and flow diagram can be found within Stateflow® from The MathWorks, Inc. of Natick, Mass. FIG. 8A shows an example of the emplary state-based and flow diagram 102 in which a reference pattern is identified in another embodiment. The model 102 controls a power window that can be commanded to go up and down or not move at all, which is a neutral state. The model 102 includes stayNeutral state 104, goUp state 106 and goDown state 108. If the window is commanded to go up, the controller enters an initial up state 110 in which the window starts moving, and the controller waits to identify whether the user command is maintained. If the user issues the up command for a short period of time, such as 100 clock ticks, the controller enters a state 112 in which the window is moved up automatically. If the user continues to issue the up command, the window is moved up in a manual mode 114 and the up movement is stopped when the user releases the up command.

The same control structure is identified for the down behavior, which can be manual and automatic as well, based on the same event structure. That is, if the window is commanded to go down, the controller enters an initial down state 116 in which the window starts moving, and the controller waits to identify whether the user command is maintained. If the user issues the down command for a short period of time, such as 100 clock ticks, the controller enters a state 220 in which the window is moved down automatically. If the user continues to issue the down command, the window is moved down in a manual mode 118 and the down movement is stopped when the user releases the down command.

Figure 8B:
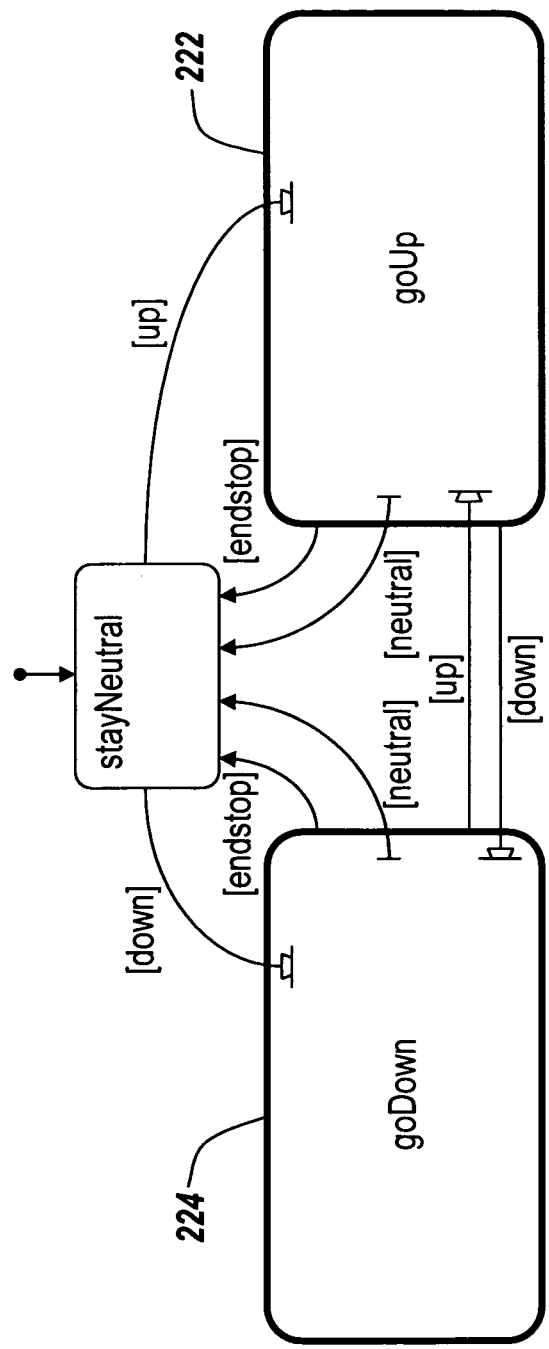
FIG. 8B shows that the same event structures depicted in FIG. 8A are replaced with a reference pattern.

In one embodiment, the similar event structures of the go up and go down movements are identified and replaced by one reference structure as shown in FIG. 8B. In FIG. 8B, the event structures of the go up movement and go down movement are replaced by models 222 and 224, respectively, that reference the same event structure. This reference structure could be stored in another model, in a library, in a local representation within the original model, or using any other mechanism for sharing. The names of the states that are part of the reference pattern and the event names do not need to exactly match as long as they are structurally the same.

Figure 9:
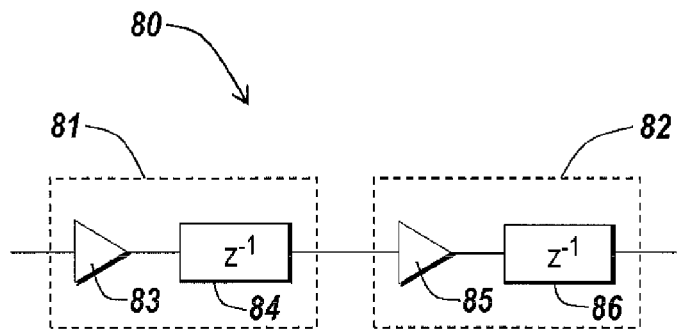
FIG. 9 depicts an exemplary block diagram in which portions of the block diagram having the same pattern are replaced with a sub-model block referring to the same pattern.

In other embodiments, the reference pattern can be entered by the user so that the verification and validation tool 32 can search the block diagram for the reference pattern. In these embodiments, the user may be provided with a user interface (UI) that enables the user to enter the reference pattern. Alternatively, the verification and validation tool 32 may identify the patterns of the block diagram and determines portions of the block diagram that has the same or similar pattern. The verification and validation tool 32 then creates a sub-model for the pattern and replaces the duplicated portions with the sub-model. As depicted in FIG. 9, for example, the verification and validation tool 32 identifies the patterns of the block diagram and determines that the portions 81 and 82 have the same pattern. The verification and validation tool 32 then creates a sub-model for the pattern and replaces the portions 81 and 82 with the sub-model, which may result in the same block diagram as depicted in FIG. 8.

Figure 10:
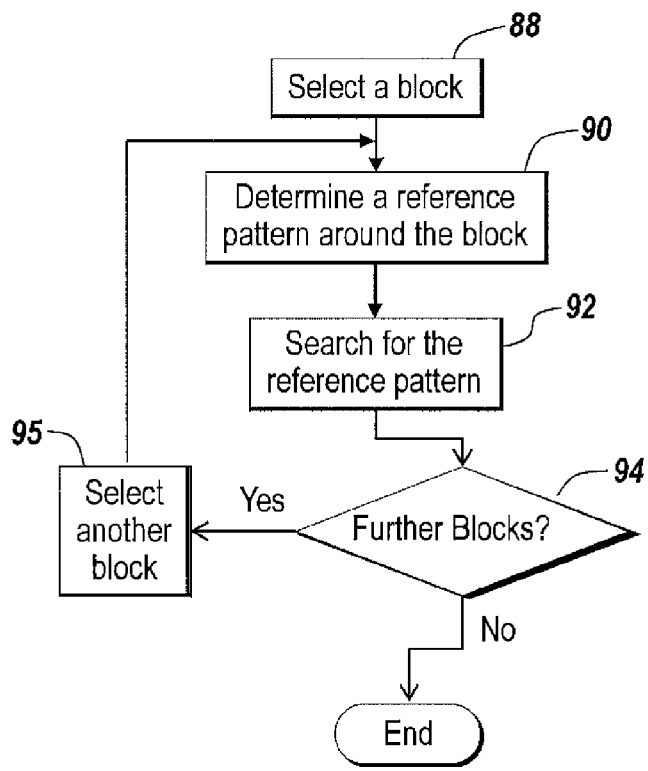
FIG. 10 is a flow chart showing an exemplary operation for identifying the patterns of a block diagram and determining the duplicated portions of the same pattern.

FIG. 10 is a flow chart showing an exemplary operation for identifying the patterns of a block diagram and determining the duplicated portions of the same pattern. The verification and validation tool 32 may select a reference block, for example the gain block 83, in the block diagram (step 88). The verification and validation tool 32 may then determine a reference pattern around the reference block, such as the pattern of the interconnected gain block 83 and delay block 84 (step 90). The verification and validation tool 32 may determine portions of the block diagram that have the same pattern as the reference pattern, such as the portion 82 including the interconnected gain block 85 and delay block 86 (step 92). The process can be repeated with other blocks in the block diagram (steps 94 and 95). One of skill in the art will appreciate that the determining step (step 90) can be implemented differently depending on the embodiments. For example, when there is a portion that is the same as the reference pattern, the reference pattern can be increased to determine a maximum size of duplicated portions in the block diagram.

The verification and validation tool 35 may conduct an exact-match search in which the verification and validation tool 35 determines the portions of the block diagram that have the same pattern as the reference pattern. The verification and validation tool 35 may also conduct a near-match search or partial-match search in which the verification and validation tool 35 determines the portions of the block diagram that have the similar patterns to the reference pattern. The similarity of the patterns can be given by the percentage of the matches. The similarity of the patterns can be determined by comparing blocks and connectivities between the blocks in the portions of the block diagram. In an embodiment, the number of blocks and the attribute of each block, including the name and type of the block, can be compared to determine the percentage of the matches. For example, in FIG. 9, if the portion 82 includes a continuous time integrator block instead of the delay block 86, the illustrative embodiment may determine a partial match between the portions 81 and 82. The partial match can be percentaged by the similarity of the continuous time integrator block and the delay block, which can be predetermined by the user. As another example, if the portion 82 had another gain block connected between the gain block 85 and the delay block 86, the additional gain block having a different factor, a partial match can be identified where either the two blocks in portion 81 and the three blocks in portion 82 can be used for the percentage computation, or the one gain block in portion 81 and the two gain blocks in portion 82 can be used for the percentage computation. In Stateflow, a partial match be declared if identical structures are found in the state transition behavior, but one may keep a deep or shallow history of the last state before reentry. Other such criteria for partial matches are clear to the skilled practitioner in the art. If the near-match search or partial match search is conducted, the user may be allowed to change the sub-model block that replaces the original portion of the block diagram so the original portion of the block diagram can be properly represented by the sub-model block.

Although the pattern identification of the present invention is described within a single model in the illustrative embodiment, those of skill in the art will appreciate that the pattern identification of the present invention can apply across multiple models. Those of skill in the art will also appreciate that the pattern identification of the present invention can apply to a hierarchical model that includes one or more sub-models.

Figure 11:
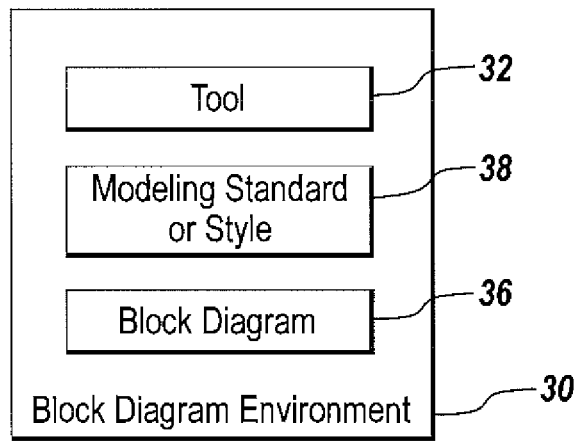
FIG. 11 shows an exemplary block diagram environment suitable for practicing another illustrative embodiment of the present invention.

The illustrative embodiment may identify the patterns of the block diagram model to determine whether the patterns of the block diagram model comply with a modeling standard or style. FIG. 11 is an exemplary block diagram environment 30 suitable for practicing the illustrative embodiment of the present invention. The block diagram environment 30 may include a verification and validation tool 32, a block diagram 36 and a modeling standard or style 38. The modeling standard or style 38 may be Mathworks Automotive Advisory Board (MAAB) guidelines. The MAAB guidelines are a basis for project success and teamwork and support achieving system integration, clean interfaces, uniform appearance of models, code and documentation, reusable models, readable models, hassle-free exchange of models, avoidance of legacies, a clean process, professional documentation, understandable presentations, fast software changes, cooperation with subcontractors, handing over of (research or predevelopment) projects (to product development). In particular, the MAAB guidelines include the guidelines of Simulink® patterns for if-then-else-if constructs, case constructs, logical constructs, vector signals, etc. The MAAB guidelines also include the guidelines of flowchart patterns for conditions, condition actions, if-then-else-if constructs, case constructs, loop construct, etc. The MAAB guidelines further include the guidelines of state machine patterns for conditions, transition actions, etc. One of ordinary skill in the art will appreciate that the MAAB guidelines are illustrative and not limiting the scope of the present invention.

In another illustrative embodiment, the modeling standard or style 38 can be provided by providing multiple models and determining common patterns of the multiple models. In this case, a user can provide multiple models for establishing the modeling standard or style 38. The verification and validation tool 32 may determine common patterns of the multiple models using the pattern identification method described above. The verification and validation tool 32 may establish the modeling standard or style 38 based on the common patterns identified from the multiple models. The common pattern may be a desirable pattern or undesirable pattern. If the common pattern is an undesirable pattern, the verification and validation tool 32 may set a constraint in the modeling standard or style 38 that corresponds to the common pattern. These steps can be repeated with different sets of models to establish modeling standards or styles 38

Figure 12:
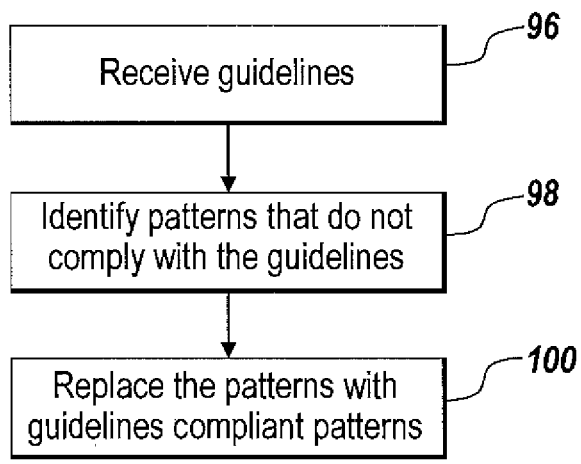
FIG. 12 is a flow chart showing an exemplary operation of the block diagram environment depicted in FIG. 11.

FIG. 12 is a flow chart showing an exemplary operation of the block diagram for identifying the patterns of the block diagram 36 to determine whether the patterns of the block diagram model 36 comply with a modeling standard or style 38. The verification and validation tool 32 receives the modeling standard or style 38, such as MAAB guidelines and those extracted from other models (step 96). The verification and validation tool 32 searches the block diagram 36 for the patterns that comply or do not comply with the modeling standard or style (step 98). The patterns that do not comply with the modeling standard or style 38 can be replaced with patterns that comply with modeling standard or style(step 100). If the standard or style is a constraint, the patterns that comply with the modeling standard or style 38 can be replaced with patterns that are suggested by a user. In some instances, a user may be allowed to define a pattern to be searched and the pattern with which the searched pattern is replaced.

Since certain changes may be made without departing from the scope of the present invention, it is intended that all matter contained in the above description or shown in the accompanying drawings be interpreted as illustrative and not in a literal sense. For example, the illustrative embodiment of the present invention may be practiced in any graphical modeling environments. Practitioners of the art will realize that the sequence of steps and architectures depicted in the figures may be altered without departing from the scope of the present invention and that the illustrations contained herein are singular examples of a multitude of possible depictions of the present invention.

What is claimed is:

1. In a computational device that provides a modeling environment, a method for building an executable block diagram model, the method comprising:
   identifying, using a processor of the computational device, a reference pattern in an executable block diagram model, the reference pattern comprising a first group of interconnected blocks in a portion of the executable block diagram model, the executable block diagram model included in a model file;
   programmatically identifying, using the processor of the computational device, one or more other portions of the executable block diagram model having a near-match pattern, the near match pattern being a partial match of the reference pattern, the programmatically identifying comprising:
   searching the model file of the executable block diagram model,
   identifying the near-match pattern based on the searching, the near-match pattern comprising a second group of interconnected blocks,
   calculating a degree of similarity between the reference pattern and the near match pattern by comparing a number of blocks and attributes of the blocks between the first group of interconnect blocks and the second group of interconnected blocks,
   replacing, in response to the identifying the near match pattern based on the searching and the calculating the degree of similarity, the near-match pattern of the executable block diagram model with an executable block diagram sub-model, wherein the sub-model is a shared executable block diagram model representing the reference pattern, the replacing being performed using the processor of the computational device; and
   storing an edit of the executable block diagram sub-model, wherein the edit changes the executable block diagram sub-model to correspond to the near-match pattern.

2. The method of claim 1, further comprising:
   searching the model for the near-match pattern across a hierarchy of the model.

3. The method of claim 1, wherein identifying the reference pattern comprises:
   enabling a user to specify the reference pattern.

4. The method of claim 1, wherein the reference pattern and the near-match pattern are identified with a series or collection of interconnected elements of the model.

5. The method of claim 1, wherein the sub-model is a subsystem and the reference pattern comprises a group of interconnected elements in the subsystem.

6. The method of claim 1, wherein the sub-model is a referenced model and the reference pattern comprises a group of interconnected elements in the referenced model.

7. The method of claim 1, wherein the replacing comprises:
   enabling a user to select one or more other portions to be replaced.

8. The method of claim 1, further comprising:
   enabling a user to modify the sub-model to comply with one or more replaced portions of the model.

9. The method of claim 1, wherein code for the sub-model is shared by the one or more other portions of the model at simulation or code generation of the model.

10. The method of claim 1, wherein the executable block diagram model comprises at least one of a state-based diagram model, an entity flow network model and a data flow model.

11. The method of claim 1, wherein the programmatically identifying further comprises:
    determining that the near-match pattern is a same pattern as the reference pattern;
    increasing the size of the reference pattern to create a larger reference pattern; and
    identifying a duplicated portion of the executable block diagram model having the larger reference pattern.

12. A computer-implemented system for building an executable block diagram model, the system comprising:
    a processor of a computer configured to provide:
    a pattern identifier for identifying, using the processor of the computer, a reference pattern in a first executable block diagram model, the reference pattern comprising a first group of interconnected blocks in the first executable block diagram model;
    a software tool for programmatically identifying, using the processor of the computer, one or more portions of a second executable block diagram model having a near-match pattern, the near-match pattern being a partial match of the reference pattern, and replacing at least one of the portions of the second model with an executable block diagram sub-model representing the reference pattern, wherein the sub-model is a shared model, the second executable block diagram model included in a model file, the programmatically identifying comprising:
    searching the model file of the second executable block diagram model,
    identifying the near-match pattern based on the searching, the near-match pattern comprising a second group of interconnected blocks,
    calculating a degree of similarity between the reference pattern and the near match pattern by comparing a number of blocks and attributes of the blocks between the first group of interconnect blocks and the second group of interconnected blocks;
    replacing, in response to the identifying the near match pattern based on the searching and the calculating the degree of similarity, the near-match pattern of the second executable block diagram model with an executable block diagram sub-model, wherein the sub-model is a shared executable block diagram model representing the reference pattern; and
    storing an edit of the executable block diagram sub-model, wherein the edit changes the executable block diagram sub-model to correspond to the near-match pattern.

13. The system of claim 12, wherein the first executable block diagram model and the second executable block diagram model are the same model.

14. The system of claim 12, wherein the pattern identifier comprises:
    a user interface for enabling a user to enter the reference pattern.

15. The system of claim 12, wherein the pattern identifier identifies the reference pattern with a series or collection of interconnected elements of the second executable block diagram model.

16. The system of claim 12, further comprising:
   an execution engine for simulating the second executable block diagram model, wherein code for the sub-model is shared for the replaced portions of the second executable block diagram model to simulate the second executable block diagram model.

17. The system of claim 12, further comprising:
   a code generator for generating code for the second executable block diagram model, wherein code for the sub-model is shared for the replaced at least one of the portions of the second executable block diagram model in generated code for the second executable block diagram model.

18. A non-transitory computer-readable storage medium for holding instructions executed in a computer for a method of building an executable block diagram model, the method comprising:
   identifying, using a processor of the computer, a reference pattern in a first executable block diagram model, the reference pattern comprising a first group of interconnected blocks in the first executable block diagram model;
   programmatically identifying, using the processor of the computer, one or more portions of a second executable block diagram model having a near-match pattern, the near match pattern being a partial match of the reference pattern, the second executable block diagram model included in a model file, the programmatically identifying comprising:
      searching the model file of the second executable block diagram model,
      identifying the near-match pattern based on the searching, the near-match pattern comprising a second group of interconnected blocks,
      calculating a degree of similarity between the reference pattern and the near match pattern by comparing a number of blocks and attributes of the blocks between the first group of interconnect blocks and the second group of interconnected blocks,
   replacing, in response to the identifying of the near match pattern based on the searching and the calculating the degree of similarity, the near-match pattern of the second model with an executable block diagram sub-model representing the reference pattern, wherein the sub-model is a shared model, the replacing being performed using the processor of the computer, and
   storing an edit of the executable block diagram sub-model, wherein the edit changes the executable block diagram sub-model to correspond to the near-match pattern.

19. The medium of claim 18, wherein the first executable block diagram model and the second executable block diagram model are the same model.

20. The medium of claim 18, further comprising:
   searching the model for the near-match pattern across a hierarchy of the second executable block diagram model.

21. The medium of claim 18, wherein the identifying the near-match pattern comprises:
   enabling a user to specify the reference pattern that is to be searched in the second executable block diagram model.

22. The medium of claim 18, wherein the reference pattern is identified with a series or collection of interconnected elements of the first executable block diagram model.

23. The medium of claim 18, wherein the sub-model is a subsystem and the reference pattern comprises a group of interconnected elements in the subsystem.

24. The medium of claim 18, wherein the sub-model is a referenced model and the reference pattern comprises a group of interconnected elements in the referenced model.

25. The medium of claim 18, wherein the replacing comprises:
   enabling a user to select one or more of the portions to be replaced.

26. The medium of claim 18, further comprising:
   enabling a user to modify the sub-model to comply with one or more replaced portions of the second executable block diagram model.

27. The medium of claim 18, wherein code for the sub-model is shared by one or more replaced portions of the model at simulation or code generation of the second executable block diagram model.

28. The medium of claim 18, wherein the second executable block diagram model comprises at least one of a state-based model, an entity flow network model and a data flow model.

29. In a computational device that provides a modeling environment, a method for building an executable block diagram model, the method comprising:
   identifying, using a processor of the computational device, a reference pattern in a state-based model, reference the pattern comprising a first group of interconnected states in a portion of the state-based model, the state-based model included in a model file;
   programmatically identifying, using the processor of the computational device, one or more other portions of the state-based model having a near-match pattern, the near-match pattern being a partial match of the reference pattern, the programmatically identifying comprising:
      searching the model file of the state-based model,
      identifying the near-match pattern based on the searching, the near-match pattern comprising a second group of interconnected states,
      calculating a degree of similarity between the reference pattern and the near match pattern by comparing a number of states and attributes of the states between the first group of interconnected states and the second group of interconnected states;
   replacing, in response to the identifying the near match pattern based on the searching and the calculating the degree of similarity, the near-match pattern of the state-based model with an executable state-based sub-model representing the reference pattern, wherein the sub-model is a shared state-based model, the replacing being performed using the processor of the computational device; and
   storing an edit of the executable state-based sub-model, wherein the edit changes the executable state-based sub-model to correspond to the near-match pattern.

30. The method of claim 29, wherein the programmatically identifying the one or more other portions of the state-based model having the pattern comprises locating a transition that is present in the near-match pattern in the one or more other portions.

31. The method of claim 29, further comprising generating code for the portion of the state-based model.

32. In a computational device that provides a modeling environment, a method for building an executable block diagram model, the method comprising:
   identifying, using a processor of the computational device, a reference pattern in a first executable block diagram model, the reference pattern comprising a first group of interconnected blocks in the first executable block diagram model;

programmatically identifying, using the processor of the computational device, one or more portions of a second executable block diagram model having a near-match pattern, the near-match pattern being a partial match of the reference pattern, the second executable block diagram included in a model file, the identifying comprising:
  searching the model file of the second executable block diagram model,
  identifying the near-match pattern based on the searching, the near-match pattern comprising a second group of interconnected blocks,
  calculating a degree of similarity between the reference pattern and the near match pattern by comparing a number of blocks and attributes of the blocks between the first group of interconnected blocks and the second group of interconnected blocks;
replacing, in response to the identifying the near match pattern based on the searching and the calculating the degree of similarity, the near-match pattern of the second executable block diagram model with an executable block diagram sub-model representing the reference pattern, wherein the sub-model is a shared executable block diagram model, the replacing performed using the processor of the computational device; and
storing an edit of the executable block diagram sub-model, wherein the edit changes the executable block diagram sub-model to correspond to the near-match pattern.

33. The method of claim 32, further comprising generating code for a portion of the first executable block diagram model.

* * * * *

UNITED STATES PATENT AND TRADEMARK OFFICE
CERTIFICATE OF CORRECTION

PATENT NO. : 8,726,232 B1  
APPLICATION NO. : 11/293647  
DATED : May 13, 2014  
INVENTOR(S) : James Carrick et al.

Page 1 of 1

It is certified that error appears in the above-identified patent and that said Letters Patent is hereby corrected as shown below:

On the Title Page, Item (73) Assignee, line 1, delete "Math Works," and insert --MathWorks,-- therefor; and In the Claims Column 15, line 39, (Claim 18), delete "interconnect" and insert --interconnected-- therefor.

Signed and Sealed this  
Ninth Day of September, 2014

Michelle K. Lee  
*Deputy Director of the United States Patent and Trademark Office*